(12) United States Patent
Burns et al.

(10) Patent No.: US 7,891,203 B1
(45) Date of Patent: Feb. 22, 2011

(54) METHOD AND SYSTEM FOR COOLING ITEMS USING VEHICLE HVAC SYSTEM

(75) Inventors: Trevor Burns, Milford Center, OH (US); Ronald W. Myers, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/637,406

(22) Filed: Dec. 14, 2009

(51) Int. Cl.
F25B 1/00 (2006.01)
(52) U.S. Cl. .......................................... 62/115; 62/244
(58) Field of Classification Search .................. 62/115, 62/244, 239, 440, 434, 243, 337, 457.1, 457.7, 62/457.9; 454/144, 145, 146, 284; 165/41, 165/42; 296/37.12, 37.8; 220/592.2, 592.21
See application file for complete search history.

(56) References Cited

U.S. PATENT DOCUMENTS

| | | | |
|---|---|---|---|
| 2,902,838 A * | 9/1959 | Nichols .................... | 62/244 |
| 4,892,138 A | 1/1990 | Bibik, Jr. | |
| 5,165,646 A * | 11/1992 | Gewecke .................. | 248/311.2 |
| 5,181,555 A * | 1/1993 | Chruniak .................. | 165/41 |
| 5,203,833 A * | 4/1993 | Howell ..................... | 165/41 |
| 5,701,754 A * | 12/1997 | Choi et al. ................ | 62/244 |
| 6,206,442 B1 * | 3/2001 | Breunig .................... | 296/37.12 |
| 6,412,287 B1 | 7/2002 | Hughes et al. | |
| 6,422,300 B1 | 7/2002 | Wylin | |
| 7,073,338 B2 | 7/2006 | Harwood et al. | |
| 7,082,773 B2 * | 8/2006 | Cauchy ..................... | 62/3.3 |
| 7,389,650 B2 | 6/2008 | Kukucka et al. | |
| 7,726,143 B2 * | 6/2010 | Marginean et al. ......... | 62/244 |
| 2005/0257531 A1 | 11/2005 | Kadle et al. | |
| 2008/0148752 A1 | 6/2008 | Marginean et al. | |
| 2010/0156131 A1 * | 6/2010 | D'Alessandro et al. .... | 296/37.8 |
| 2010/0244478 A1 * | 9/2010 | Depue ...................... | 296/24.43 |

* cited by examiner

Primary Examiner—Mohammad M Ali
(74) Attorney, Agent, or Firm—Rankin Hill & Clark LLP (57) ABSTRACT

A vehicle heating, ventilation and air conditioning ("HVAC") system includes an HVAC control, a fan, an evaporator downstream from the fan, a cooler box downstream from the evaporator, a condenser in fluid communication with the evaporator and a compressor in fluid communication with the condenser and the evaporator. A method for cooling items using the HVAC system includes detecting a cooler box signal from the HVAC control, in response to detecting the cooler box signal, opening or closing a valve interposed between the evaporator and the cooler box, and in response to detecting the cooler box signal, performing at least one of the following: changing an HVAC mode or adjusting power delivered to the fan. Opening the valve can allow cool air to travel through a passage toward the cooler box. Closing the valve can block cool air from traveling through the passage toward the cooler box.

20 Claims, 4 Drawing Sheets

METHOD AND SYSTEM FOR COOLING ITEMS USING VEHICLE HVAC SYSTEM

BACKGROUND

The present disclosure generally relates to cooling items in a vehicle in addition to or separate from cooling the passenger compartment, and more particularly relates to a method and system for cooling items (e.g., food, beverages, etc.) using the vehicle HVAC system.

Vehicles having a built-in cooler for storing food and beverages are known to use a compressor, which is not the same compressor for the HVAC system, or to use the vehicle air conditioning refrigerant loop. Using a vehicle HVAC system to cool items, e.g. beverages, food, etc., within a storage bin located in the vehicle is also known. For example, a storage bin located near a vehicle glove box connects to the vehicle HVAC system so the cooled air is provided into the storage bin via the air conditioning system. It is also known to cool individual beverages using the vehicle HVAC system by placing these beverages in a housing where the housing is connected with a vehicle HVAC system so that cool air from the air conditioning system is blown over the beverage container.

Known systems that employ the vehicle HVAC system to cool a cooled storage bin or to cool an individual beverage are turned on and off by a mechanical shut-off valve (if the system is shut off at all). Also in these known systems, there is no control link between the cooled storage bin being ON or OFF and the vehicle HVAC operation. Accordingly, operation of the cooling storage bin can be to the detriment of the HVAC system, which can adversely affect the comfort of the vehicle cabin.

SUMMARY

A vehicle heating, ventilation and air conditioning ("HVAC") system that can overcome the aforementioned shortcomings includes an HVAC control, a fan, an evaporator downstream from the fan, a cooler box downstream from the evaporator, a condenser in fluid communication with the evaporator and a compressor in fluid communication with the condenser and the evaporator. A method for cooling items using the HVAC system includes detecting a cooler box signal via the HVAC control; in response to detecting the cooler box signal, opening or closing a valve interposed between the evaporator and the cooler box; and, in response to detecting the cooler box signal, performing at least one of the following: changing an HVAC mode or adjusting power delivered to the fan. Opening the valve can allow cool air to travel through a cooler box supply conduit toward the cooler box. Closing the valve can block cool air from traveling through the cooler box supply conduit toward the cooler box.

Another example of a system for cooling items in a vehicle that can overcome the aforementioned shortcomings includes a fan, an evaporator downstream from the fan, a cooler box, a supply conduit downstream from the evaporator for delivering cool air to the cooler box, a valve disposed downstream from the evaporator for controlling air flow through the supply conduit, a compressor in fluid communication with the evaporator, a cooler box signal generator, and a control communicating with the cooler box signal generator, the valve, the fan, and the compressor. The control can be configured to receive a cooler box signal from the cooler box signal generator. The control can be configured to change an HVAC mode or to adjust power delivered to the fan in response to receiving the cooler box signal.

DETAILED DESCRIPTION

Figure 1:
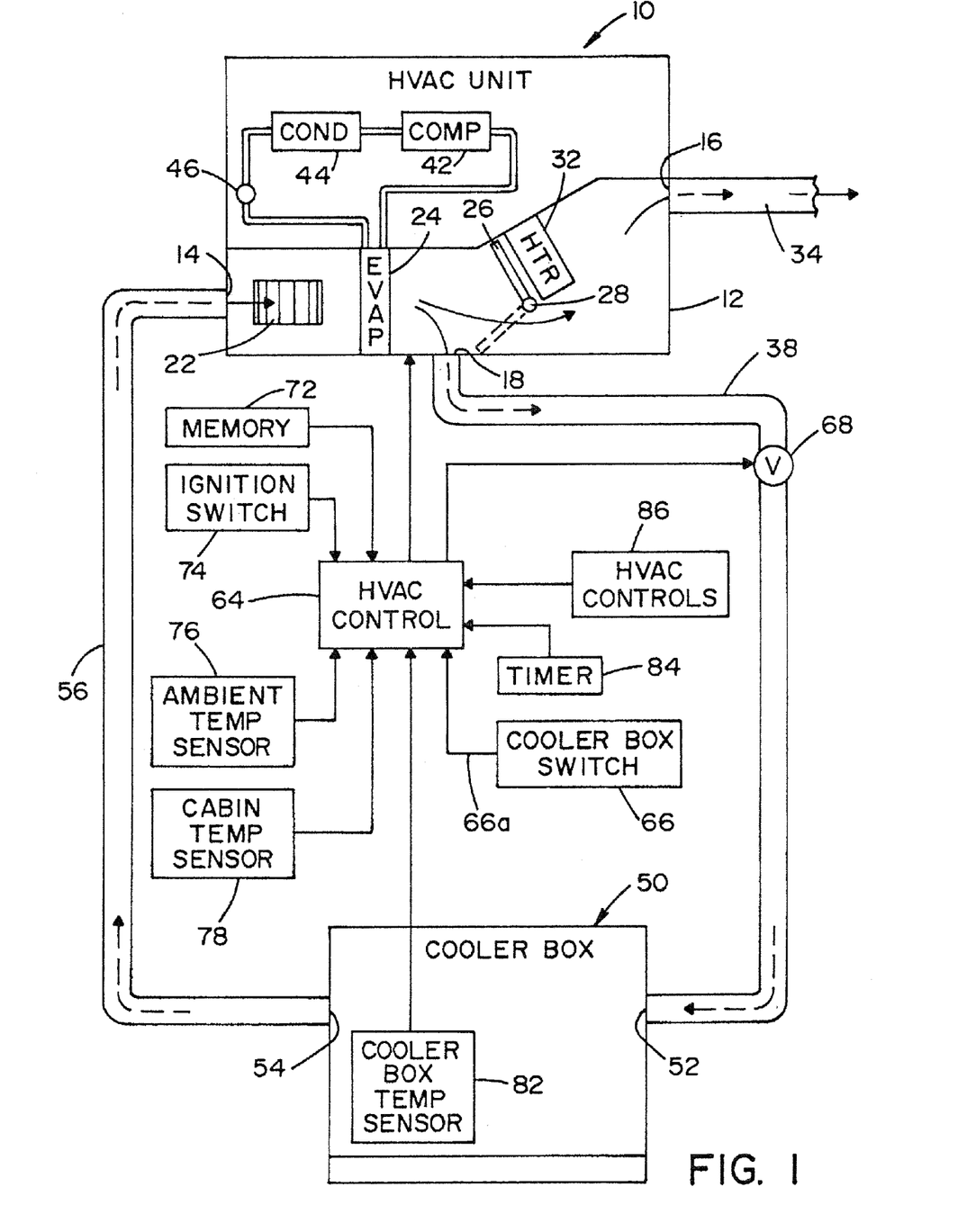
FIG. 1 is a schematic depiction of a vehicle HVAC system that includes a system for cooling items in a vehicle.

FIG. 1 schematically depicts an HVAC unit 10 for a vehicle including a housing 12 having an inlet 14, a cabin outlet 16, and a cooler box outlet 18. Air is drawn into the housing 12 through the inlet 14 (only one inlet is shown; however, multiple inlets could be provided) using a fan 22. The fan 22 propels air over or through an evaporator 24. Air that is passed through the evaporator 24 can exit the housing 12 at the cooler box outlet 18, which is downstream from the evaporator. A mixing door 26 operated by a mixing door actuator 28 is disposed between the evaporator 24 and a heater 32. The mixing door 26 can operate between two positions including a first position (dashed lines) that allows air to flow through and over the heater 32 and a second position (solid lines) that substantially prevents air from traveling over the heater 32. In particular, the mixing door 26 can be moved to the first position, the second position, or any position between the first and second positions. At the cabin outlet 16, the housing 12 connects with a vehicle cabin supply conduit 34, which supplies conditioned air (heated or cooled) to the vehicle cabin 36 (FIG. 2) such as through floor vents, defrost vents, mid-level cabin vents, etc. The cooler box supply conduit 38 connects to the housing 12 at the cooler box outlet 18. The cooler box outlet 18 is downstream from the evaporator 24 and upstream from the heater 32 and mixing door 26 such that only cooled air (i.e., air that has not passed through the heater 32) is supplied to the cooler box supply conduit 38.

The HVAC unit 10 also includes a compressor 42, a condenser 44, and an expansion device 46. The compressor 42, the condenser 44 and the expansion device 46 are each in fluid communication with the evaporator 24 to provide a refrigeration cycle, which is known in the art, for the evaporator. Other than the addition of the cooler box outlet 18 in the housing 12 and the addition of the cooler box supply conduit 38, the HVAC unit 10 described above can be conventional. The components that provide power to the fan 22, the evaporator 24, the mixing door actuator 28, the heater 32, and the compressor 42 are not shown, but can be conventional power sources found in vehicles.

Figure 2:
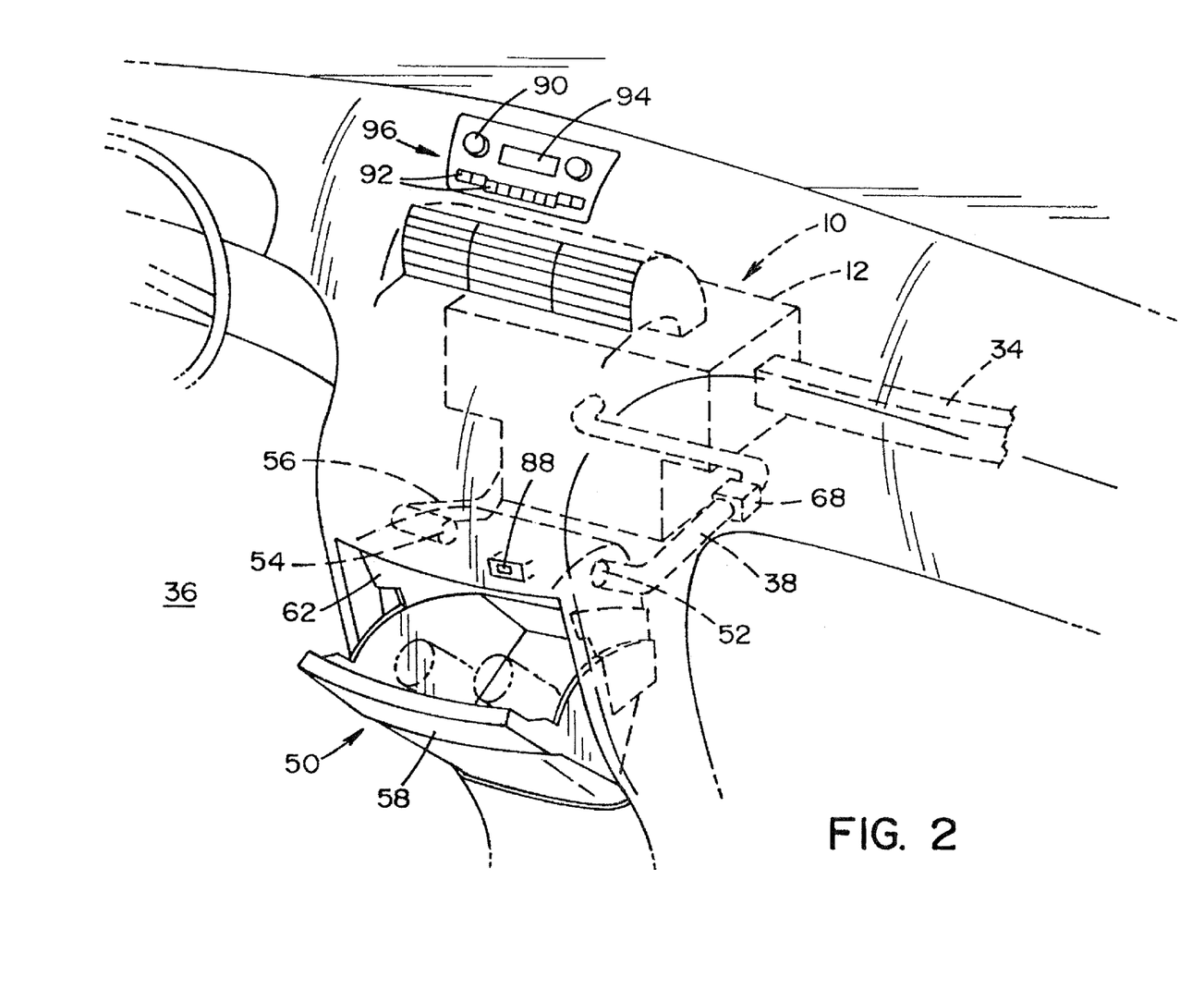
FIG. 2 is a perspective view of an interior of a vehicle showing portions of the vehicle HVAC system.

The cooler box supply conduit 38 delivers cool air to a cooler box 50. The cooler box 50 includes a cooler box inlet 52, which is connected with the cooler box supply conduit 38, and a cooler box outlet 54, which is connected to a cooler box return conduit 56. The cooler box return conduit 56 connects with the housing 12 of the HVAC unit 10 at the inlet 14. In an alternative embodiment, the cooler box outlet 54 could connect with an outlet conduit that would deliver cool air exiting the cooler box into the vehicle cabin 36. With reference to FIG. 2, in one embodiment, the cooler box 50 can be located near the front of the vehicle cabin 36, which allows the operator or the front passenger of the vehicle to access to the cooler box 50. The cooler box 50 can be configured to receive a few beverages, other food items, etc., which can be consumed during a trip. The cooler box 50 shown in FIG. 2 includes a door 58 that pivots with respect to a housing 62 to provide access to the interior of the cooler box. The cooler box 50 can of course take alternative configurations.

With reference back to FIG. 1, an HVAC control 64 controls the operation of the HVAC unit 10, along with other components that are found in the system for cooling items using the vehicle HVAC system. The HVAC control 64 can communicate with a cooler box signal generator, such as a cooler box switch 66, and a valve 68, which can control the flow of cool air to the cooler box 50. The valve 68 is depicted in the cooler box supply conduit 38; however, the valve 68 can be located elsewhere in the system between the evaporator 24 and the cooler box 50.

The HVAC control 64 can also communicate with the fan 22 and the compressor 42 found in the HVAC unit 10. The HVAC control 64 is configured to receive a cooler box signal 66a (cooler box ON or cooler box OFF) from the cooler box signal generator, e.g. the cooler box switch 66. The HVAC control 64 can also be configured to change an HVAC mode or to adjust power delivered to the fan 22 in response to receiving the cooler box signal 66a. This will be described in more detail below.

The HVAC control 64 can also be associated and/or connected with a memory 72, which can store, among other data, a state of the cooler box 50, which will be described in more detail below. The HVAC control 64 can also be in communication with an ignition switch 74 for the vehicle. The HVAC control 64 can also be in communication with an ambient temperature sensor 76, a cabin temperature sensor 78, and a cooler box temperature sensor 82. The HVAC control 64 can also be in communication with a timer 84 and HVAC operator controls 86.

With reference to FIG. 2, in one embodiment, the cooler box switch 66 (FIG. 1) can be operated by a button 88 located near the cooler box 50. An operator of the vehicle desiring to cool items stored in the cooler box 50 can actuate the button 88, which actuates the cooler box switch 66 delivering the cooler box signal 66a to the HVAC control 64. The HVAC operator controls 86 can include knobs 90, buttons 92 and a display panel 94 located on an HVAC control panel 96, which allow the operator of the vehicle to adjust the climate settings in the vehicle cabin 36. The knobs 90, buttons 92 and display panel 94 for the HVAC operator controls 86 can also be similar or the same as conventional HVAC operator controls.

Figure 3:
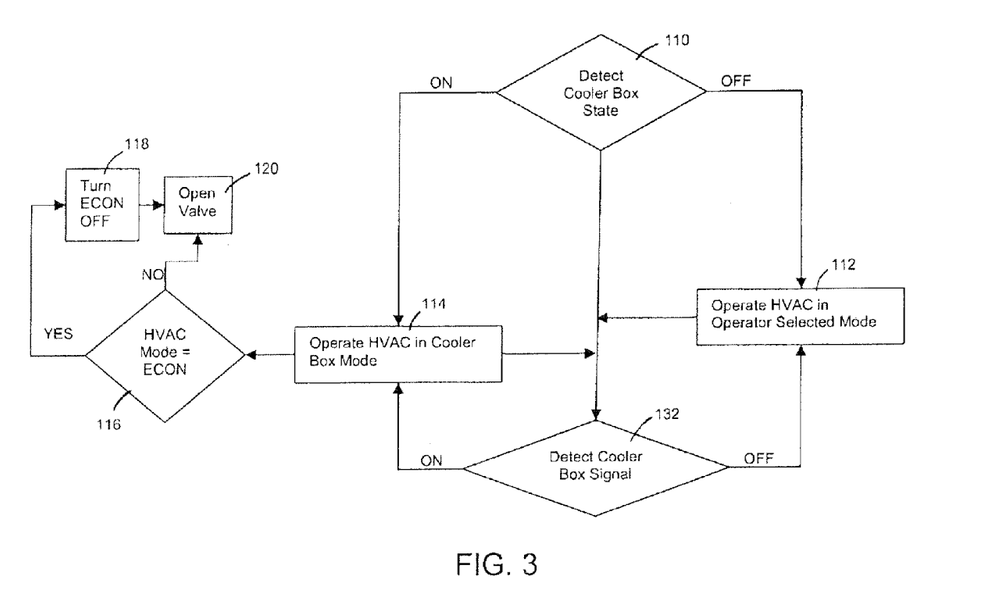
FIG. 3 is a flow chart depicting operation of the vehicle HVAC system including a method for cooling items using a vehicle HVAC system.

A method for cooling items using the vehicle HVAC system is depicted in a flow chart in FIG. 3. The method can begin at 110 by detecting a cooler box state. The flow chart in FIG. 3 is provided for understanding embodiments of the subject system, however, the invention is not limited to the arrangement of steps as shown in the figure. The steps shown in FIG. 3 can be performed in other logical orders. Generally, the system responds to receiving the cooler box signal 66a (described in more detail below) by opening or closing the valve 68 interposed between the evaporator 24 and the cooler box 50. The system also responds to detecting the cooler box signal 66a by performing at least one of the following: adjusting the HVAC mode or adjusting the power delivered to the fan 22. The cooling operation for the cooler box 50 can be controlled by the ON/OFF cooler box switch 66 and the HVAC control 64.

The method depicted in FIG. 3 typically begins when the ignition switch 74 of the vehicle is turned ON; however, this is not required. The memory 72 associated with the HVAC control 64 can store the cooler box state, e.g. cooler box ON or cooler box OFF, based on the state of the cooler box 50 when the ignition switch 74 is turned OFF, which will be described in more detail below. The HVAC control 64 can also be programmed to generate a default cooler box state, e.g. a cooler box OFF. The system can then operate, for example as described below, until the system is interrupted by the cooler box signal 66a, which can be generated by the ON/OFF cooler box switch 66. Detecting the cooler box state as ON does not require cool air to be flowing to the cooler box.

With reference back to FIG. 3, when the cooler box state is detected as OFF, at 112 the HVAC system operates in an operator selected mode. The operator of the vehicle can select the operator selected mode using the HVAC operator controls 86, e.g. knobs, buttons, and/or display, located on the HVAC control panel 96. Alternatively, the HVAC system can be configured to automatically start in an operator selected mode upon startup of the vehicle. In other words, the operator may not each time after the ignition switch 74 is turned ON select a mode in which the HVAC system will operate; however, the system can be configured to treat this automatically chosen mode as the operator selected mode. These modes can include, but are not limited to, AUTO and ECON for AC modes, as well as a heat mode and/or a defrost mode. The system can be designed to operate in the operator selected mode until interrupted by the cooler box signal.

When the cooler box state is detected ON, which could be from a request made by the operator (described below) or this state has been stored in the memory 72 associated with the HVAC control 64, at 114 the HVAC system operates in a cooler box mode. When operating in cooler box mode, the compressor 42 operates so that cool air can be delivered to the cooler box 50. Accordingly, the fan 22 is energized (if the fan was OFF) and the compressor 42 is energized (if the compressor was OFF) to deliver cool air to the cooler box 50. The system can be designed to return to the operator selected mode when the cooler box mode is no longer desired by the operator or when the system detects the cooler box state as OFF.

Many vehicle HVAC systems are configured to operate in one of an ECON mode and an AUTO mode within the AC mode. The AUTO mode prioritizes the comfortableness of the cabin and can result in the compressor 42 operating more often to cool the vehicle cabin. The ECON mode is configured to save fuel by operating the compressor 42 less often as compared to the AUTO mode. The system can be configured to return to the operator selected mode, e.g. AUTO, ECON, heat or defrost, when the cooler box state is OFF. Accordingly, when the system detects that the cooler box state as ON and the system is operating in the cooler box mode, at 114, the system detects whether the operator selected mode (as per the HVAC operator controls 86 on the HVAC control panel 96, for example) is at ECON at 116. If the operator selected mode is at ECON mode, then ECON mode can turn off at 118 to allow the compressor 42 to accommodate for a cooler box compressor demand, which will be described in more detail below.

If not already open, the valve 68 opens at 120 and the system operates in the cooler box mode (step 114) until interrupted by a cooler box signal. With the valve 68 open, the fan 22 and the compressor 42 operating, cool air can be delivered to the cooler box 50. The cooler box signal 66a can be generated by the cooler box ON/OFF switch 66.

The system can be designed to operate in the cooler box mode or the operator selected mode until the HVAC control 64 receives the cooler box signal 66a. Receiving the cooler box signal 66a results in the HVAC control 64 detecting whether the cooler box signal is a cooler box ON signal or a cooler box OFF signal at 132. If the HVAC system is operating in the cooler box mode, e.g. the cooler box state is ON, and the HVAC control detects a cooler box OFF signal, then the HVAC system reverts to the operator selected mode at 112, which could be stored in the memory 72, and operates in this mode until interrupted again by the system detecting the cooler box signal 66a (FIG. 1) at 132. If the HVAC system is operating in the operator selected mode, e.g. the cooler box state is OFF, and the HVAC control detects a cooler box ON signal at 132, then the HVAC system can store the operator selected mode (so that the system can later revert back to this mode when the cooler box is turned off) and operate in the cooler box mode at 114. The system can detect whether the operator selected mode was at ECON at 116. If the operator selected mode was at ECON, the system can turn off ECON mode at 118 and open the valve at 120.

Figure 4:
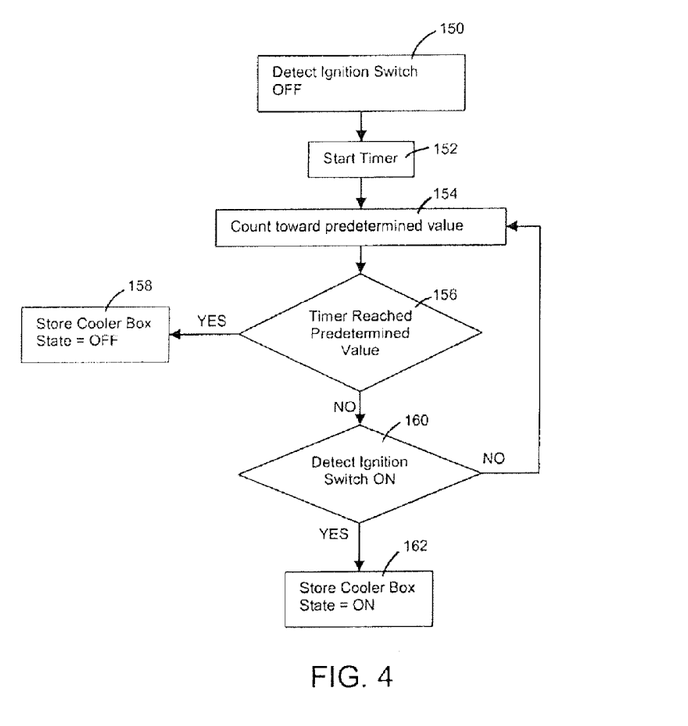
FIG. 4 is another flow chart depicting operation of the vehicle HVAC system.

With reference to FIG. 4, with the system operating in the cooler box mode (step 114 in FIG. 3), the system can be interrupted by the ignition switch 74 being turned OFF at 150. With the ignition OFF, the engine (not shown), which through a series of components (also not shown) drives the compressor 42, is also OFF. Thus the compressor 42 no longer delivers cooled fluid to the evaporator 24 so cool air is not delivered to the cooler box 50. With the ignition switch 74 being detected as OFF and the cooler box state being ON, the timer 84 starts at 152 and counts toward a predetermined value at 154. At 156 the system detects whether the timer 84 has reached the predetermined value.

If the timer 84 has reached the predetermined value, e.g. the vehicle has been off for a few minutes or so, then at 158 the cooler box state is stored in the memory 72 as being OFF. With reference back to FIG. 3, this results in the system automatically starting off in the cooler box OFF state, which results in the HVAC system operating in the operator selected mode at 112.

With reference back to FIG. 4, if the timer 84 has not reached the predetermined value at 156, then at 160 the system detects for the ignition switch 74 being ON. If the ignition switch 74 is detected ON before the timer 84 reaches the predetermined value, then the cooler box state ON is stored in the memory 72 at 162. This allows the system to automatically start up in cooler box state ON if the engine is restarted within a certain amount of time after having been shut down. If the ignition switch 74 is not detected as being ON before the timer 84 reaches the predetermined value, then the system reverts back to 154 and continues to count toward the predetermined value.

Figure 5:
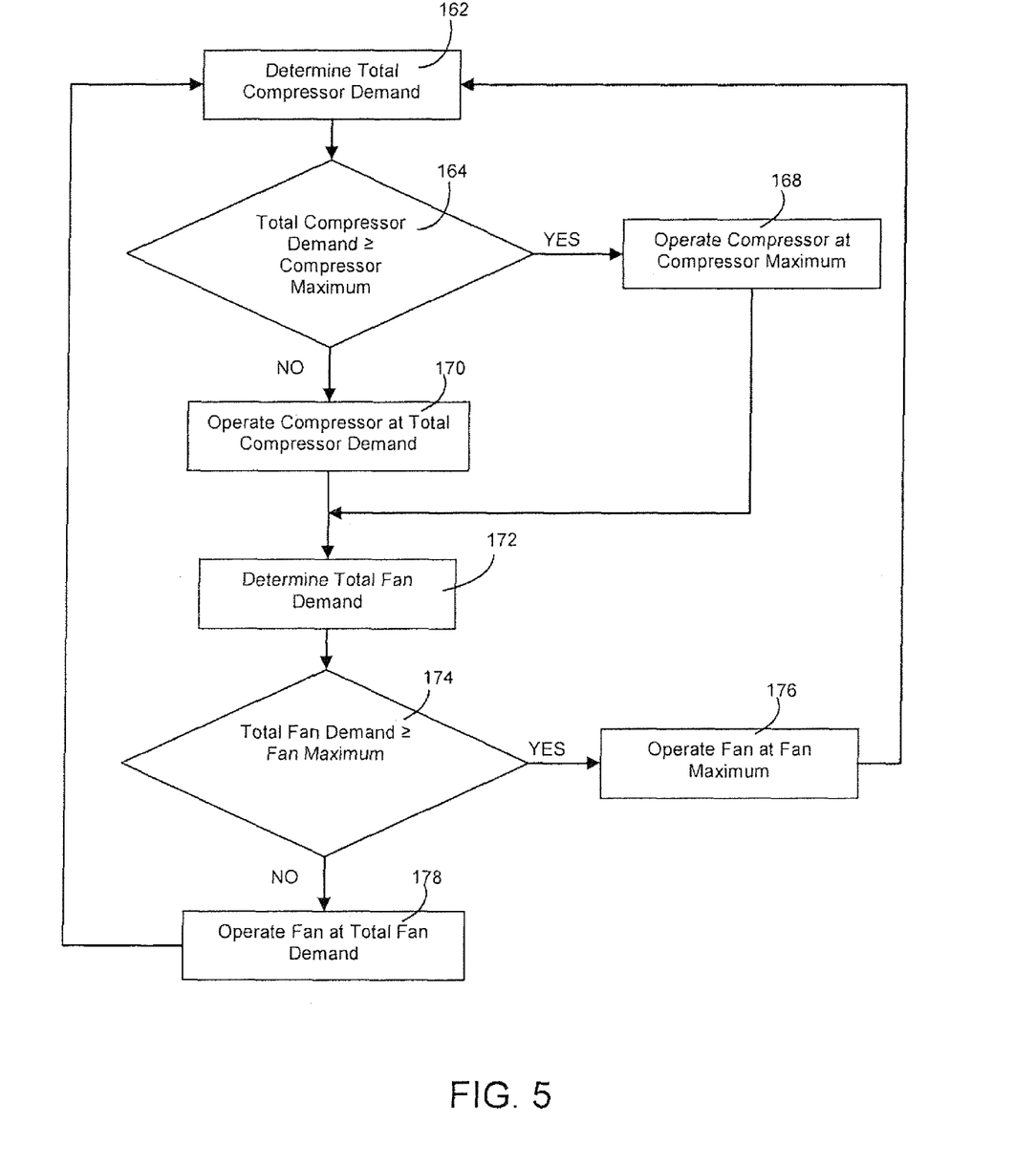
FIG. 5 is another flow chart depicting operation of the vehicle HVAC system.

An example of the operation of the HVAC system is described with reference to FIG. 5. The flow chart in FIG. 5 is provided for understanding embodiments of the subject system, however, the invention is not limited to the arrangement of steps as shown in the figure. For example, the steps shown in FIG. 5 can be performed in other logical orders.

When operating in either the cooler box mode or the operator selected mode (e.g. ECON, AUTO, heat or defrost), the system, at 162, can determine the total compressor demand for the system. The total compressor demand is based on a cabin compressor demand and a cooler box compressor demand. The cabin compressor demand is equal to the demand on the compressor 42 to cool the vehicle cabin. For example, where the AC mode is ON (either in AUTO or ECON), i.e. the operator of the vehicle has turned on the AC to cool the vehicle cabin, the compressor 42 operates to deliver cooling fluid to the evaporator 24. The compressor demand can be related to the power drawn by the compressor 42 and/or the compressor operating cycle, e.g. how often the compressor 42 comes on. The cabin compressor demand can be based on ambient air temperature, which is measured by the ambient air temperature sensor 76, cabin air temperature, which is measured by the cabin air temperature sensor 78, and a cabin temperature set point, which is set using the HVAC controls found on the climate control panel. Where the AC mode is OFF, i.e. the operator of the vehicle does not wish to cool the vehicle cabin 36 or a windshield defrost function is not operating, the compressor 42 is not operating. This would result in the cabin compressor demand to equal zero.

The cooler box compressor demand, on the other hand, is equal to the demand on the compressor 42 necessary to cool the cooler box 50. The cooler box compressor demand can be based on cooler box air temperature and a cooler box temperature set point. The cooler box air temperature is measured using the cooler box air temperature sensor 82. The cooler box temperature set point can be set using a cooler box control (which could be located on the HVAC control panel 96) operated by the operator of the vehicle. Alternatively, the cooler box temperature set point can be preset in the HVAC control 64, e.g. the cooler box set point can be 34° F. (or another value) and the vehicle operator is unable to change this set point. Additionally, the cooler box compressor demand can be preset in the HVAC control 64. Where the cooler box compressor demand is preset, the HVAC control 64 automatically determines the desired compressor cycle and/or power draw that is to be run when the cooler box state is ON. Since the cooler box compressor demand is equal to the compressor demand necessary to cool the cooler box 50, when the system detects the cooler box state to be OFF, e.g. at 110 in FIG. 3, the cooler box compressor demand equals zero.

After determining the total compressor demand at 162, e.g. by adding the cabin compressor demand and the cooler box compressor demand, the system determines whether the total compressor demand exceeds a maximum capacity for the compressor 42 at 164. The compressor 42 is designed and/or manufactured to operate at a maximum capacity, e.g. a maximum power draw and/or a maximum cycle. Where the total compressor demand exceeds or is equal to the maximum compressor capacity, at 168, the compressor 42 operates, e.g. cycles and/or draws power, at the maximum compressor capacity. Where the total compressor demand is less than the maximum compressor capacity, at 170, the compressor 42 operates at the total compressor demand.

In addition to determining the total compressor demand and operating the compressor at the maximum compressor capacity or the total compressor demand, the system can also adjust the power delivered to the fan 22 in response to the detected state of the cooler box. At step 172, the HVAC control 64 determines a total fan power demand, which is based on a cabin fan demand and a cooler box fan demand.

The cabin fan demand is equal to the fan power, e.g. voltage, used to cool or to heat the vehicle cabin 36 using the vehicle HVAC system. For example, where the AC mode is ON, the fan 22 operates to blow air over the evaporator into the vehicle cabin. The cabin fan demand can be based on ambient air temperature, cabin air temperature, and a cabin temperature set point. The cabin fan demand can also be directly controlled by the operator of the vehicle using the HVAC settings on the HVAC control panel 96. Where the HVAC system is OFF, e.g. the operator of the vehicle does not wish to cool or to heat the vehicle cabin 36 or a windshield defrost function is not operating, the fan 22 is not operating. This would result in the cabin fan demand to equal zero.

The cooler box fan demand, on the other hand, is equal to the fan power necessary to deliver cool air to the cooler box 50. The cooler box fan demand can be based on cooler box air temperature and/or a cooler box temperature set point. The cooler box fan demand can also be preset in the HVAC control. Where the cooler box fan demand is preset, the HVAC control 64 automatically determines the desired fan power when the cooler box state is detected as ON. Where the cooler box state is detected as OFF, then the fan 22 need not blow cool air into the cooler box 50, and therefore, the cooler box fan demand can be set at zero.

After determining the total fan demand at 172, e.g. by adding the cabin fan demand and the cooler box fan demand, the system can determine whether the total fan demand exceeds a maximum fan power at 174. The fan 22 is designed and/or manufactured to operate at a maximum power, e.g. voltage. Where the total fan demand exceeds or is equal to the maximum fan power, the fan operating power, e.g. the voltage at which the fan 22 operates to blow air into the cabin 36 and/or the cooler box 50, is set to the maximum fan power at 176. Where the total fan demand is less than the maximum fan power, the fan operating power is set to equal the total fan demand at 178.

After having set the fan power and the compressor operation, the system can continue to re-cycle through these decisions, as shown in FIG. 5. Accordingly, if the operator of the vehicle actuates the cooler box switch 66, the HVAC system can accommodate for the change in the demand on the compressor 42 and the fan 22 by moving through the logic in FIG. 5. For example, where the detected cooler box state is ON and where the received cooler box signal is a cooler box OFF signal, the system can return to an operator selected mode. This can result in the total compressor demand decreasing and the total fan demand decreasing. Another example is where the detected cooler box state is OFF and where the received cooler box signal is a cooler box ON signal. This can result in an increase in the total compressor demand and an increase in the total fan demand. An increase in the total fan demand can result in an increase in the power delivered to the fan.

A system and a method for cooling items using a vehicle HVAC system have been described with reference to preferred embodiments. Modifications and alterations will occur to those upon reading and understanding the preceding detailed description. The invention, however, is not limited to only the embodiments illustrated above. Instead, the invention is broadly defined by the appended claims and the equivalents thereof.

The invention claimed is:

1. A method for cooling items using a vehicle heating, ventilation and air conditioning ("HVAC") system including an HVAC control, a fan, an evaporator downstream from the fan, a cooler box downstream from the evaporator, a condenser in fluid communication with the evaporator and a compressor in fluid communication with the condenser and the evaporator, the method comprising:
   detecting a cooler box signal from the HVAC control;
   in response to detecting the cooler box signal, opening or closing a valve interposed between the evaporator and the cooler box, wherein opening the valve allows cool air to travel through a cooler box supply conduit toward the cooler box, wherein closing the valve blocks cool air from through the cooler box; and
   in response to detecting the cooler box signal, performing at least one of the following: changing an HVAC mode or adjusting power delivered to the fan.

2. The method of claim 1, further comprising:
   detecting a cooler box state; and
   where the detected cooler box state is ON and where the detected cooler box signal is a cooler box OFF signal, returning the HVAC system to an operator selected mode.

3. The method of claim 1, further comprising:
   detecting a cooler box state; and
   where the detected cooler box state is OFF and where the detected cooler box signal is a cooler box ON signal, increasing the power delivered to the fan.

4. The method of claim 1, further comprising:
   detecting an HVAC mode; and
   where the detected HVAC mode is an ECON mode, in response to detecting a cooler box ON signal, deactivating the ECON mode.

5. The method of claim 1, further comprising:
   detecting for an ignition switch OFF;
   starting a timer in response to detecting the ignition switch OFF; and
   determining whether the timer has reached a predetermined value.

6. The method of claim 5, further comprising:
   detecting for an ignition switch ON after starting the timer; and
   if the ignition switch is detected not detected ON before the timer has reached the predetermined value, then storing a cooler box state as OFF.

7. The method of claim 1, further comprising:
   determining a total compressor demand based on a cabin compressor demand and a cooler box compressor demand.

8. The method of claim 7, wherein the cabin compressor demand is based on an ambient air temperature, a cabin air temperature and a cabin temperature set point.

9. The method of claim 7, wherein the cooler box compressor demand is based on a cooler box air temperature and a cooler box temperature set point.

10. The method of claim 7, further comprising:
   determining whether the total compressor demand exceeds a maximum compressor capacity, and
   where the total compressor demand exceeds or is equal to the maximum compressor capacity, operating the compressor at the maximum compressor capacity, and
   where the total compressor demand does not exceed the maximum compressor capacity, operating the compressor at the total compressor demand.

11. The method of claim 1, further comprising:
   determining a total fan demand based on a cabin fan demand and a cooler box fan demand.

12. The method of claim 11, further comprising:
   determining whether the total fan demand exceeds a maximum fan power, and
   where the total fan demand exceeds or is equal to the maximum fan power, setting a fan operating power at the maximum fan power, and
   where the total fan demand does not exceed the maximum fan power, setting the fan operating power to equal the total fan demand.

13. A system for cooling items in a vehicle, the system comprising:
   a fan;
   an evaporator downstream from the fan;
   a cooler box;
   a supply conduit downstream from the evaporator for delivering cool air to the cooler box;
   a valve disposed downstream from the evaporator for controlling air flow through the supply conduit;
   a compressor in fluid communication with the evaporator;
   a cooler box signal generator;
   a control communicating with the cooler box signal generator, the valve, the fan, and the compressor, wherein the control is configured to receive a cooler box signal from the cooler box signal generator, and wherein the control is configured to change an HVAC mode or to adjust power delivered to the fan in response receiving the cooler box signal.

14. The system of claim 13, wherein the valve is disposed in the supply conduit.

15. The system of claim 13, wherein the cooler box signal generator includes a switch positioned adjacent the cooler box.

16. The system of claim 13, wherein the cooler box is configured to receive a beverage.

17. The system of claim 13, further comprising a timer in communication with the control, wherein the timer is configured to count toward a predetermined value in response to the control detecting that an ignition switch is OFF.

18. The system of claim 13, wherein the control is configured to open or to close the valve in response to receiving the cooler box signal from the cooler box signal generator.

19. The system of claim 13, further comprising a memory associated with the control, the memory being configured to store a cooler box state upon detection of an ignition switch being OFF.

20. The system of claim 13, wherein the control is further configured to detect an ON state or an OFF state for the cooler box.

\* \* \* \* \*

UNITED STATES PATENT AND TRADEMARK OFFICE
CERTIFICATE OF CORRECTION

| | | |
|---|---|---|
| PATENT NO. | : 7,891,203 B1 | |
| APPLICATION NO. | : 12/637406 | |
| DATED | : February 22, 2011 | |
| INVENTOR(S) | : Trevor Burns and Ronald W. Myers | |

It is certified that error appears in the above-identified patent and that said Letters Patent is hereby corrected as shown below:

Col. 7, Line 14 in Claim 1, please insert the word --traveling-- before the word "through";

Col. 8, Line 4 in Claim 6, please delete the first occurrence of the word "detected".

Signed and Sealed this

Twenty-sixth Day of April, 2011

David J. Kappos
*Director of the United States Patent and Trademark Office*